United States Patent [19]
Ohashi

[11] Patent Number: 5,737,125
[45] Date of Patent: Apr. 7, 1998

[54] DIFFRACTIVE OPTICAL ELEMENT AND OPTICAL SYSTEM INCLUDING THE SAME

[75] Inventor: Hitoshi Ohashi, Hachioji, Japan

[73] Assignee: Olympus Optical Co., Ltd., Tokyo, Japan

[21] Appl. No.: 555,222

[22] Filed: Oct. 31, 1995

Related U.S. Application Data

[63] Continuation of Ser. No. 141,909, Oct. 27, 1993, abandoned.

[30] Foreign Application Priority Data

Oct. 27, 1992 [JP] Japan .................. 4-288977
Dec. 24, 1992 [JP] Japan .................. 4-344671

[51] Int. Cl.$^6$ .................. G02B 5/18; G02B 5/22; G02B 13/14
[52] U.S. Cl. .................. 359/565; 359/566; 359/575; 359/570; 359/885
[58] Field of Search .................. 359/16, 565, 566, 359/568, 575, 573, 19, 885, 570

[56] References Cited

U.S. PATENT DOCUMENTS

| | | | |
|---|---|---|---|
| 4,057,326 | 11/1977 | Knop .................. | 359/568 |
| 4,079,411 | 3/1978 | Engenbrecht et al. .................. | 359/575 |
| 4,246,339 | 1/1981 | Kaplan .................. | 359/575 |
| 4,400,057 | 8/1983 | Moraw et al. .................. | 359/575 |
| 4,886,341 | 12/1989 | Oishi et al. .................. | 359/575 |
| 4,936,666 | 6/1990 | Futhey .................. | 359/573 |
| 5,013,133 | 5/1991 | Buralli et al. . | |
| 5,044,706 | 9/1991 | Chen . | |
| 5,093,749 | 3/1992 | Maeda .................. | 359/575 |
| 5,117,306 | 5/1992 | Cohen .................. | 359/565 |
| 5,148,314 | 9/1992 | Chen .................. | 359/565 |
| 5,161,040 | 11/1992 | Yokoyama et al. .................. | 359/565 |
| 5,161,059 | 11/1992 | Swanson et al. .................. | 359/565 |
| 5,283,690 | 2/1994 | Miyake et al. .................. | 359/575 |
| 5,367,588 | 11/1994 | Hill et al. .................. | 359/573 |
| 5,386,319 | 1/1995 | Whitney .................. | 359/575 |

FOREIGN PATENT DOCUMENTS

| | | | |
|---|---|---|---|
| 56-57010 | 5/1981 | Japan .................. | 359/575 |
| 2179605A | 7/1990 | Japan . | |
| 2251904A | 10/1990 | Japan . | |
| 2-277003 | 11/1990 | Japan .................. | 359/573 |
| 4178601A | 6/1992 | Japan . | |
| 1078392 | 3/1984 | Russian Federation .................. | 359/575 |
| 4317137 | 11/1993 | United Kingdom .................. | 359/575 |

*Primary Examiner*—Jon W. Henry
*Attorney, Agent, or Firm*—Watson Cole Stevens Davis, P.L.L.C.

[57] ABSTRACT

An optical system for use in a relatively wide wavelength range including a plurality of diffractive optical elements whose diffraction efficiencies are optimized for different wavelengths within said predetermined wavelength range. A diffractive optical element for use in a wide wavelength range includes a light transmissive substrate having a plurality of surface regions and a plurality of surface relief diffractive gratings are formed in said surface regions such that diffraction efficiencies of these gratings are optimized for different wavelengths within said predetermined wavelength range. A diffractive optical element is formed by a single optical element having a light transmissive substrate which reveals a given spectral transmittance and a surface relief diffractive grating formed in a surface of said substrate such that a wavelength dependency of said grating provides a desired spectral transmittance together with said spectral transmittance of the substrate.

7 Claims, 6 Drawing Sheets

DIFFRACTIVE OPTICAL ELEMENT AND OPTICAL SYSTEM INCLUDING THE SAME

This application is a continuation of application Ser. No. 08/141,909, filed Oct. 27, 1993 (abandoned).

BACKGROUND OF THE INVENTION

1. Field of the Invention

The present invention relates to a diffractive optical element and an optical system including the same, and more particularly relates to a diffractive optical element for use in a relatively wide wavelength range.

2. Description of the Related Art

Due to a recent progress in the lithography, there has been established a method of manufacturing a surface relief diffractive grating and there has been also proposed an optical system including such a surface relief diffractive grating. For instance, in U.S. Pat. No. 5,044,706, there is described an infrared telescopic optical system comprising a surface relief diffractive grating in order to reduce aberrations. Further, in Japanese Patent Application Laid-open Publication Kokai Hei 4-178601, there is disclosed another known surface relief diffractive grating array having a plurality of grating regions provided on a single substrate and these grating regions have different periods in order to obtain different diffraction angles of respective regions.

The diffractive optical element is an element utilizing the diffracting phenomenon and has an optical property which is quite different from that of an optical element utilizing the ordinary refracting phenomenon. For instance, a diffraction efficiency of the diffractive optical element depends on a wavelength of incident light. This property is called a wavelength dependency of diffraction efficiency. As is well known in the art, the diffraction efficiency is an efficiency at which incident light is diffracted into a desired direction. When the diffraction efficiency is low, an optical system using the diffractive optical element has a low light utilizing efficiency. Therefore, the diffractive optical element is usually designed to have an optimum diffraction efficiency at a given wavelength.

Known diffractive optical elements are designed to have optimum diffraction efficiency at a single wavelength, and the diffraction efficiency is abruptly reduced for wavelengths departing from the given wavelength. When a plurality of diffractive optical elements are provided in an optical system, a diffraction efficiency of the optical system is expressed by a product of diffraction efficiencies of these elements and therefore the optical system might show a relatively large wavelength dependency in spectral transmittance characteristics. Such a wavelength dependency prevents the diffractive optical element from being used in the optical system for light having a wide wavelength band.

There have been proposed various methods of optimizing the surface relief diffractive grating for a predetermined wavelength. In one optimizing method, a depth of a relief construction is optimized. When a transmission type blazed diffractive grating is optimized by this method, a first order diffraction efficiency $\eta$ can be expressed by the following equation.

$$\eta = \left[ \frac{\sin\left\{ \frac{n-1}{\lambda} d - 1 \right\} \pi}{\left\{ \frac{n-1}{\lambda} d - 1 \right\} \pi} \right]^2 \quad (1)$$

wherein n denotes a refractive index of a substrate on which the diffractive grating is formed, $\lambda$ a wavelength of incident light and d represents a depth of the relief structure.

When such a diffractive grating is optimized for a given wavelength $\lambda_0$, the depth of the relief structure is represented as follows.

$$D_0 = \lambda_0/(n_0-1) \quad (2)$$

wherein $n_0$ is a refractive index of the substrate in which the diffractive grating is formed. If the diffractive grating is formed to satisfy the above condition, the diffraction efficiency of the wavelength $\lambda_0$ becomes 100% ($\eta=1$).

The first order diffraction efficiency $\eta$ for an arbitrary wavelength $\lambda$ of the diffractive grating which has been optimized for the wavelength $\lambda_0$ may be obtained by introducing the equation (2) into the equation (1) in the following manner.

$$\eta = \left[ \frac{\sin\left\{ \frac{\lambda_0}{\lambda} - 1 \right\} \pi}{\left\{ \frac{\lambda_0}{\lambda} - 1 \right\} \pi} \right]^2 \quad (3)$$

In this case, the refractive index n of the substrate is assumed to be constant for the wavelength $\lambda$.

FIG. 1 is a graph showing the wavelength dependency of the first order diffraction efficiency $\eta$ of the diffractive grating which is optimized for a wavelength $\lambda_0=520$ nm. For a wavelength of 400 nm, the diffractive efficiency is reduced to about 75% and for a wavelength of 750 nm, the diffraction efficiency is also reduced to about 75%. In this manner, the diffractive grating which has been designed to be optimal for the given wavelength has a low diffraction efficiency for wavelengths different from the given wavelength.

In the known diffractive grating disclosed in the above mentioned Japanese Patent Application Laid-open Publication Kokai Hei 2-179605, the diffractive grating is designed to be usable for wavelengths different from a desired wavelength. That is to say, the diffraction efficiency is optimized for a single desired wavelength. Also in the known diffractive grating described in the above mentioned U.S. Pat. No. 5,044,706, although the diffractive grating may be used for a wavelength range from 8 μm to 12 μm, the diffractive grating is optimized for an average wavelength of 10 μm. In the above mentioned Japanese Patent Application Laid-open Publication Kokai Hei 4-178,601, all the regions of the diffractive grating are designed such that the diffraction efficiency is optimized for a single wavelength. In this manner, in optical systems comprising the known diffractive gratings, the transmittance of the optical systems is liable to be dependent upon the wavelength to a large extent.

Particularly, when a plurality of diffractive gratings are provided in the optical system, the transmittance of the optical system is determined by a product of the wavelength dependencies each being expressed by the equation (3) and thus the transmittance of the whole optical system over a given wavelength range might be greatly reduced. It should be noted that the wavelength dependency of diffraction efficiency for higher order diffractions becomes larger than that expressed by the equation (3).

FIG. 2 is a schematic cross sectional view illustrating another known surface relief diffractive grating which has been optimized for a given wavelength. This diffractive grating is generally called a phase type rectangular grating. In this grating, the diffraction efficiencies of a zero order light and m order light are denoted by the following equations (4) and (5), respectively.

$$\eta = 4q(q-1)\sin\phi + 1 \quad (4)$$

$$\eta = \left\{ \frac{2\sin(q m\pi)}{m\pi} \sin\phi \right\}^2 \quad (5)$$

wherein q denotes a duty cycle of the diffractive grating, m is integer numbers other than 0 ($m=\pm 1, \pm 2 ---$), and $\phi$ is represented by the following equation.

$$\phi = (n_2 - n_1)\pi h/\lambda \quad (6)$$

wherein $n_1$ and $n_2$ are refractive indices of surrounding medium and grating substrate, respectively, and h expresses a depth of grooves having rectangular cross section and formed in a surface of the diffractive grating substrate. As can be understood from the above equations, the diffraction efficiency of the phase type rectangular diffractive grating depends on the refractive indices of the surrounding medium, usually air and substrate, the depth h of the grooves, the wavelength $\lambda$ and the duty cycle q. Therefore, when the wavelength of the incident light is changed, $\phi$ is also changed and thus the diffraction efficiency is changed.

SUMMARY OF THE INVENTION

The present invention has for its object to provide a novel and useful diffractive optical element in which the spectral transmittance characteristics can be improved.

It is another object of the invention to provide a diffractive optical element in which the diffraction efficiency can be made substantially constant over a relatively wide wavelength range.

According to a first aspect of the invention, a diffractive optical element for use in a predetermined wavelength range comprises:

a light transmissive substrate having a plurality of surface regions formed in at least one of incident and exit surfaces; and a plurality of surface relief diffractive gratings each being formed in respective surface regions of said light transmissive substrate, diffraction efficiencies of said plurality of surface relief diffractive gratings being optimized for different wavelengths within said predetermined wavelength range so as to provide a desired spectral transmittance.

In the diffractive optical element according to the invention, the diffraction efficiencies of a plurality of diffractive gratings are optimized for different wavelengths, so that the spectral transmittance of the diffractive optical element does not contain a sharp peak.

According to a second aspect of the invention, a diffractive optical element for use in a predetermined wavelength range comprises:

a light transmissive substrate having given spectral transmittance characteristics over said predetermined wavelength range and including light incident and exit surfaces; and at least one diffractive surface formed in one of said incident and exit surfaces of said light transmissive substrate and having a wavelength dependency of diffraction efficiency such that said wavelength dependency of diffraction efficiency provides a desired spectral transmittance together with said spectral transmittance characteristics of the light transmissive substrate.

In this diffractive optical system according to the invention, the diffraction efficiencies of respective diffractive gratings formed in respective surface regions are optimized for different wavelengths, and thus a substantially flat spectral transmittance can be realized over the predetermined wavelength range by means of a single diffractive optical element. Therefore, an optical system using such a diffractive optical element can be made simple in construction, small in size, light in weight and less expensive in cost.

The present invention also relates to an optical system for use in a predetermined wavelength range and has for its object to provide a novel and useful optical system including a diffractive optical element, in which a substantially uniform spectral transmittance can be obtained over a relatively wide wavelength range.

According to the invention, an optical system for use in a predetermined wavelength range comprises:

a first diffractive optical element whose diffractive efficiency is optimized for a first wavelength within said predetermined wavelength range; and a second diffractive optical element whose diffraction efficiency is optimized for a second wavelength which is within said predetermined wavelength range but is different from said first wavelength.

In this optical system, it is possible to optimize respective diffractive elements for different wavelengths independently from each other. Then, a spectral transmittance of the whole optical system is given by a superimposition of a plurality of functions having peaks at different wavelengths if a decay due to a refractive system is ignored, so that a spectral transmittance of the whole optical system becomes substantially flat over the given wavelength range as compared with the known optical system in which a plurality of diffractive elements are optimized for the same wavelength. In this manner, the wavelength dependency of diffraction efficiency of the diffractive optical element can be improved.

According to another aspect of the invention, an optical system for use in a predetermined wavelength range comprises:

at least one diffractive optical element having a given wavelength dependency of diffraction efficiency; and at least one optical element having spectral transmittance characteristics which provide a desired spectral transmittance over said predetermined wavelength range together with said wavelength dependency of diffraction efficiency of said diffractive optical element.

In this optical system, the wavelength dependency of diffraction efficiency of the diffractive optical element can be compensated for by the spectral transmittance characteristics of the optical element, and therefore the whole optical system has a desired spectral transmittance over a given wavelength range.

According to still another aspect of the invention, an optical system comprises:

at least one diffractive optical element having a given wavelength dependency of diffraction efficiency; and at least one optical element having spectral transmittance characteristics which provide a desired spectral transmittance over said predetermined wavelength range together with said wavelength dependency of diffraction efficiency of said diffractive optical element.

DESCRIPTION OF THE PREFERRED EMBODIMENTS

Figure 1:
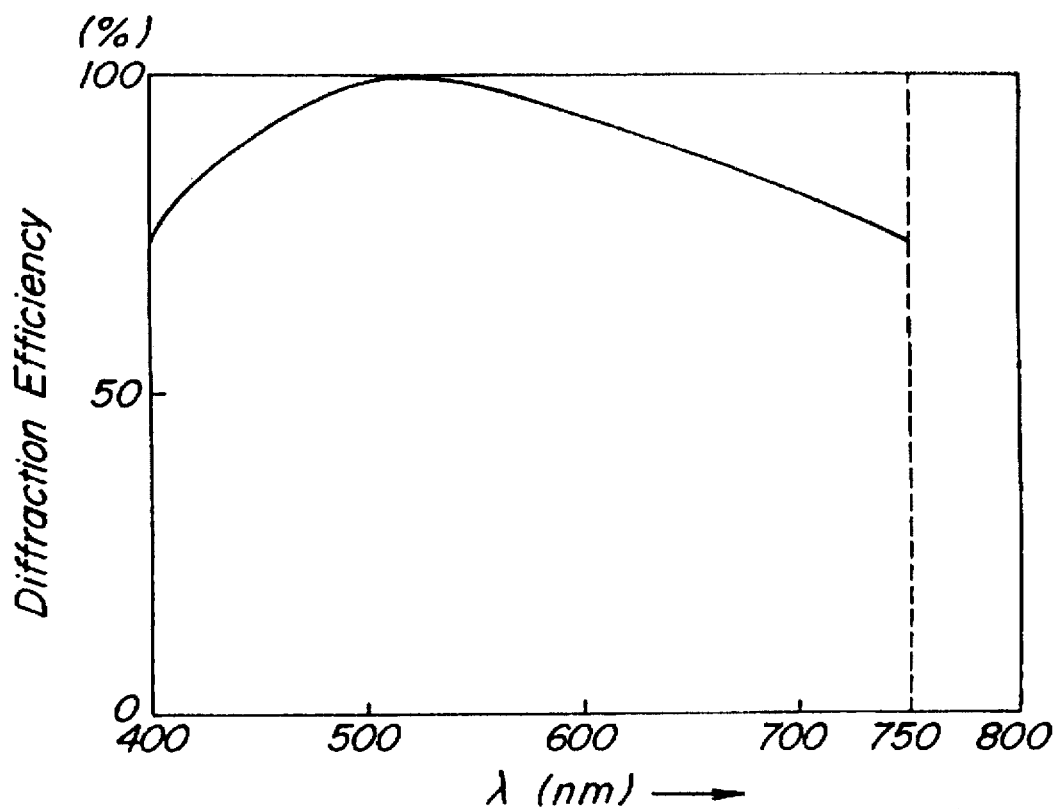
FIG. 1 is a graph showing the first order diffractive efficiency of a known diffractive grating.
Figure 2:
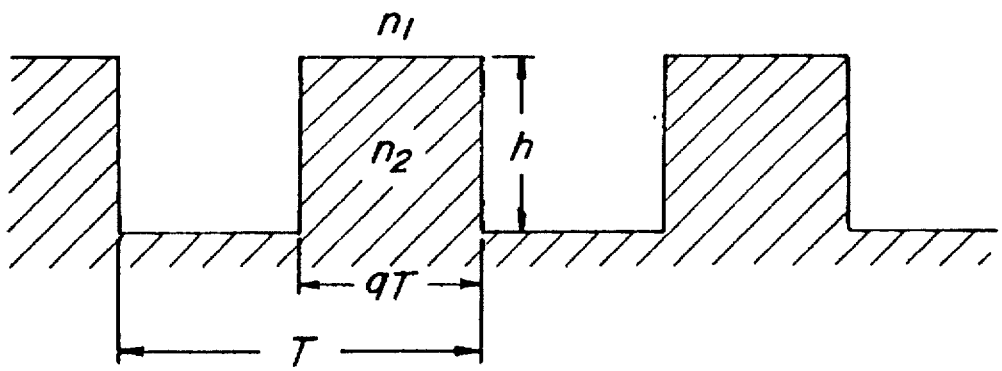
FIG. 2 is a schematic cross sectional view illustrating a known phase type rectangular diffractive grating.
Figure 3:
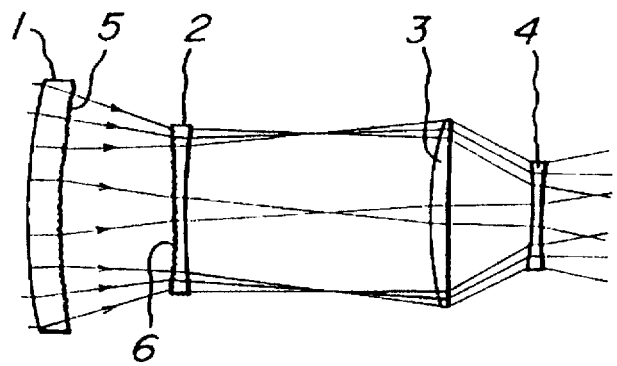
FIG. 3 is a schematic view depicting a first embodiment of the optical system according to the invention comprising a first embodiment of the diffractive optical element according to the invention.

FIG. 3 is a schematic view showing a first embodiment of the optical system according to the invention. In the present embodiment, the optical system is constructed as an infrared telescope. The optical system comprises first convex lens 1, first concave lens 2, second convex lens 3 and second concave lens 4. In an exiting surface of the first convex lens 1 there is formed a first diffractive grating pattern 5 and in an incident surface of the first concave lens 2 there is formed a second diffractive grating pattern 6. In the above mentioned U.S. Pat. No. 5,044,706, there is disclosed the infrared telescopic optical system having the same general construction as that of the first embodiment of the optical system of the present invention. However, in this known infrared telescopic optical system, the first and second diffractive grating patterns are constructed to be optimum for the same single wavelength. In the optical system according to the invention, the first and second diffractive grating patterns 5 and 6 are formed as the first order diffractive gratings such that the diffraction efficiencies of these diffractive gratings are optimized for different wavelengths within a predetermined wavelength range.

Figure 4:
FIG. 4 is a schematic cross sectional view showing a diffractive grating pattern of the first embodiment of the diffractive optical element shown in FIG. 3.

Each of the first and second diffractive grating patterns 5 and 6 is formed by blazing the surface of the lens as shown in FIG. 4 in such a manner that a depth $d_1$ of the first diffractive grating pattern 5 differs from a depth $d_2$ of the second diffractive grating pattern 6. That is to say, the first diffractive grating pattern 5 is formed to have such a depth d that the first order diffraction efficiency is optimized for a wavelength $\lambda_1$ of 1400 nm and the second diffractive grating pattern 6 is formed such that the first order diffraction efficiency is optimized for a wavelength $\lambda_2$ of 1700 nm.

Figure 5:
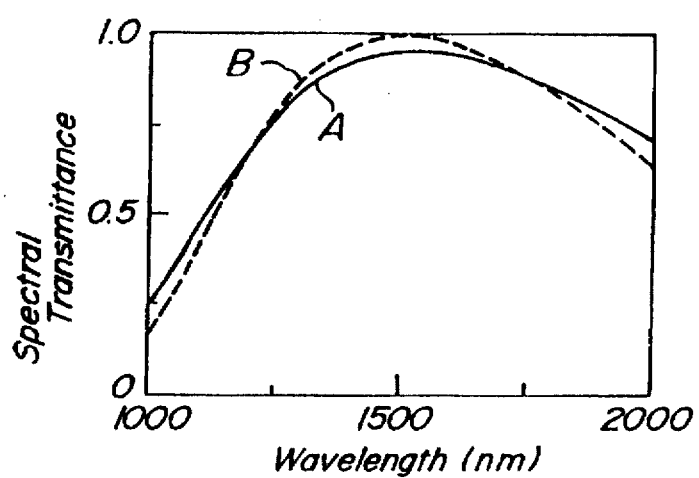
FIG. 5 is a graph showing the spectral transmittance of the first embodiment of the optical system of FIG. 3.

In FIG. 5, the spectral transmittance of the infrared telescopic optical system shown in FIG. 3 over a wavelength range from 1000 to 2000 nm is represented by a solid curve A and that of the known infrared telescopic optical system in which the first and second diffractive grating patterns are optimized for a single wavelength of 1500 nm is shown by a broken curve B. It should be noted that the transmittance of the lenses 3 and 4 in which the diffractive optical element is not formed is 1. As can be clear from the graph shown in FIG. 5, according to the invention, the spectral transmittance of the whole optical system over the wavelength range does not contain a sharp peak and is flattened as compared with the known optical system. In this manner, according to the invention, the wavelength dependency of diffraction efficiency can be effectively improved.

Figure 6:
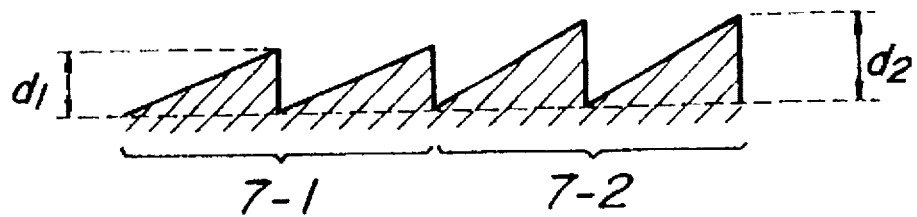
FIG. 6 is a schematic cross sectional view illustrating a diffractive grating pattern of the diffractive optical element according to the invention.

FIG. 6 is a schematic cross sectional view showing a second embodiment of the diffractive optical element according to the invention. The diffractive optical element of the present embodiment is also constructed as the blazed diffractive grating lens. In the present embodiment, the diffractive optical element comprises a plurality of regions 7-1 and 7-2 and a depth $d_1$ of a surface relief structure formed in the region 7-1 differs from a depth $d_2$ of a surface relief structure formed in the region 7-2. It should be noted that the first and second regions 7-1 and 7-2 have the same surface area. Then, the first order diffraction efficiency of the surface relief structure in the region 7-1 is optimized for a wavelength $\lambda_1$ of 500 nm and the first order diffraction efficiency of the surface relief structure in the region 7-2 is optimized for a wavelength $\lambda_2$ of 700 nm.

Figure 7:
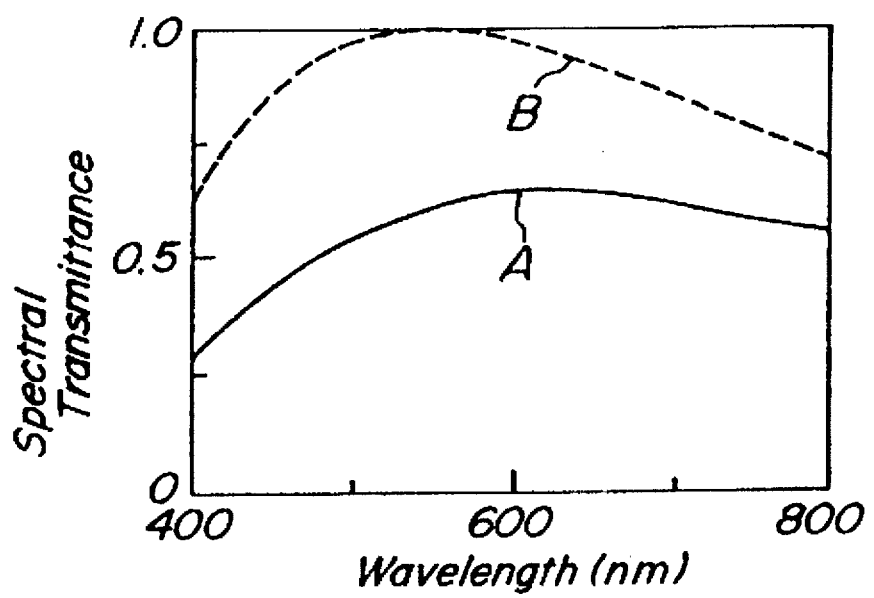
FIG. 7 is a graph representing the spectral transmittance of the diffractive optical element shown in FIG. 6.

A solid curve A in FIG. 7 represents the spectral transmittance of the diffractive grating lens shown in FIG. 6 and a broken curve B denotes that of a known diffractive grating lens which is optimized for a wavelength $\lambda$ of 550 nm within a predetermined wavelength range from 400 to 800 nm. As can be understood from the graph shown in FIG. 7, in the diffractive optical element according to the invention, it is possible to realize a substantially flat spectral transmittance over a wide wavelength range although the diffraction efficiency is reduced as compared with the known diffractive optical element.

In the present embodiment, a half of incident light is transmitted through the first region 7-1 and a remaining half is transmitted through the second region 7-2, so that the total spectral transmittance may be expressed by a sum of the spectral transmittances of the first and second regions 7-1 and 7-2. Therefore, the spectral transmittance of the whole optical system is decreased as compared with the first embodiment shown in FIG. 3.

Figure 8:
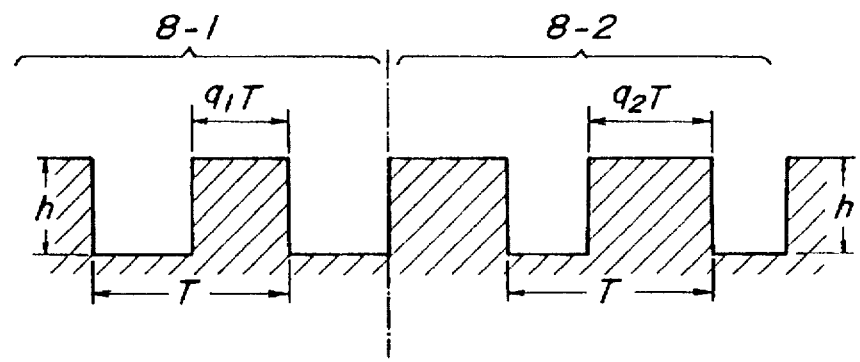
FIG. 8 is a schematic cross sectional view depicting another embodiment of the diffractive optical element according to the invention.

FIG. 8 is a schematic cross sectional view illustrating a third embodiment of the diffractive optical element according to the invention. In the present embodiment, the diffractive optical element is formed as the surface relief diffractive grating of the phase type rectangular grating. There are provided a plurality of regions 8-1 and 8-2. In the region 8-1, there are formed grooves each having a rectangular cross section and a first duty cycle q and in the region 8-2, there are also formed grooves each having a rectangular cross section and a second duty cycle $q_2$ which is different from the first duty cycle $q_1$. It should be noted that in the present embodiment a depth h of the grooves is the same. In this manner, the surface relief structure in the region 8-1 is formed such that its diffraction efficiency is optimized for a first wavelength $\lambda_1$ and the surface relief structure in the region 8-2 is formed to have an optimum diffraction efficiency for a second wavelength $\lambda_2$ which is different from the first wavelength $\lambda_1$. Therefore, also in the present embodiment, the wavelength dependency of diffraction efficiency can be improved as in the second embodiment shown in FIG. 6.

Figure 9A:
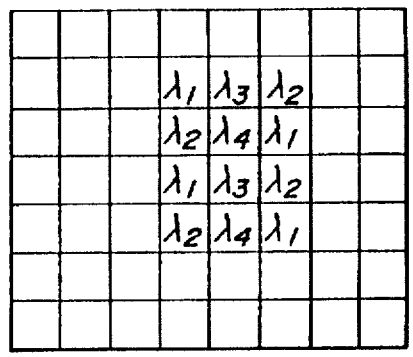
FIGS. 9A and 9B are schematic plan views illustrating an embodiment of a low pass filter including the diffractive grating shown in FIG. 8.
Figure 9B:
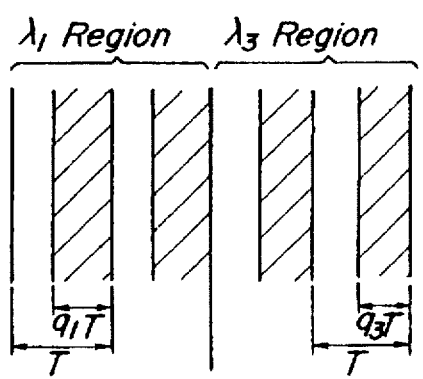

The diffractive grating shown in FIG. 8 may be advantageously utilized as an optical low pass filter for a solid state image pick-up device such as a CCD camera. In a known optical low pass filter formed by the diffractive grating, the wavelength dependency of diffractive efficiency is not improved so that it is difficult to obtain a substantially flat spectral transmittance. When the surface relief diffractive grating shown in FIG. 8 is arranged as shown in FIG. 9A and the duty cycles of these regions are different from each other as illustrated in FIG. 9B such that the diffraction efficiencies of these regions are optimized for different wavelengths $\lambda_1$-$\lambda_4$, the influence of the diffraction efficiency due to the wavelength can be efficiently improved.

Figure 10:
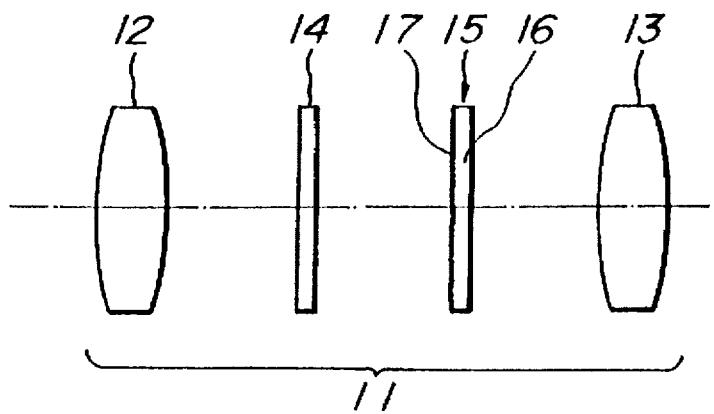
FIG. 10 is a schematic view showing a second embodiment of the optical system according to the invention.

FIG. 10 is a schematic view showing a second embodiment of the optical system according to the invention. An optical lens system 11 comprises first and second refractive lenses 12 and 13, an optical element 14 having a predetermined spectral transmittance and a diffractive element 15. The diffractive element 15 has a surface relief diffractive grating pattern 16 formed in its surface and being blazed for a given wavelength, e.g. 520 nm. The wavelength dependency of diffraction efficiency of the diffractive element 15 is shown by a solid curve A in FIG. 11. The optical element 14 has a spectral transmittance represented by a broken curve B in FIG. 11. Then, a total spectral transmittance of the optical element 14 and diffractive element 15 becomes substantially flat as shown by a chain curve C in FIG. 11. It should be noted that the transmittance of the whole lens system 11 is somewhat reduced, but the spectral transmittance over a whole wavelength range of visible light is uniform and is about 75%. Therefore, the lens system 11 of the present embodiment may be advantageously used in a general focusing lens system for the visible light wavelength range.

Figure 11:
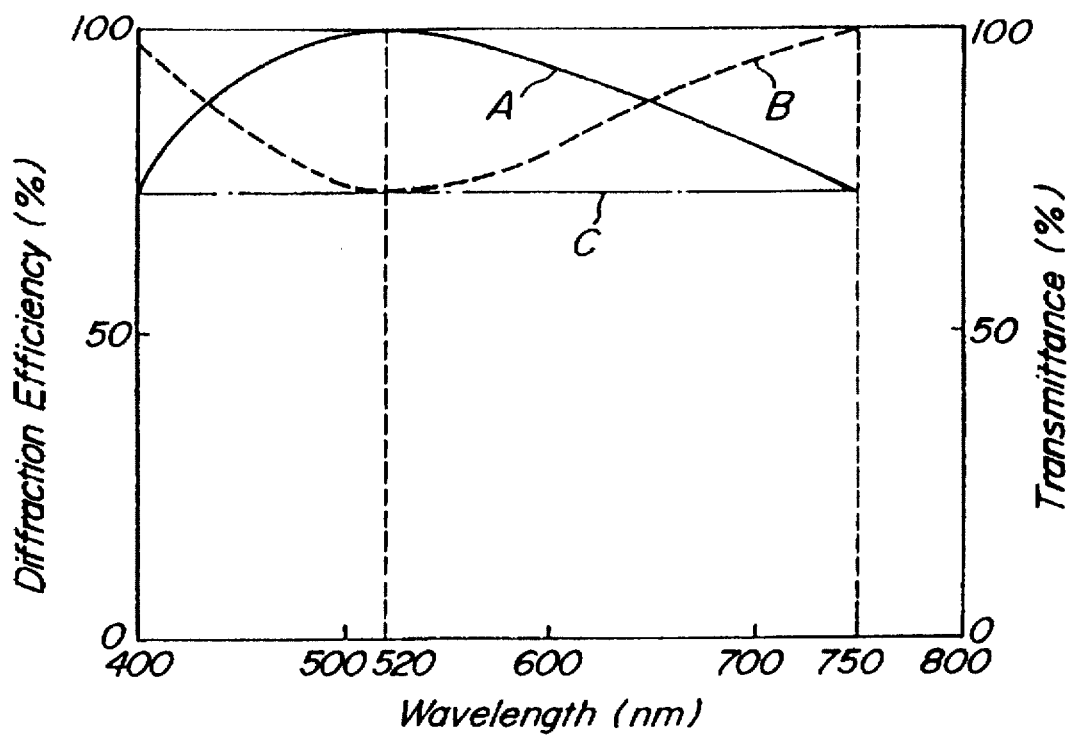
FIG. 11 is a graph representing a spectral transmittance of the optical system shown in FIG. 10.
Figure 12:
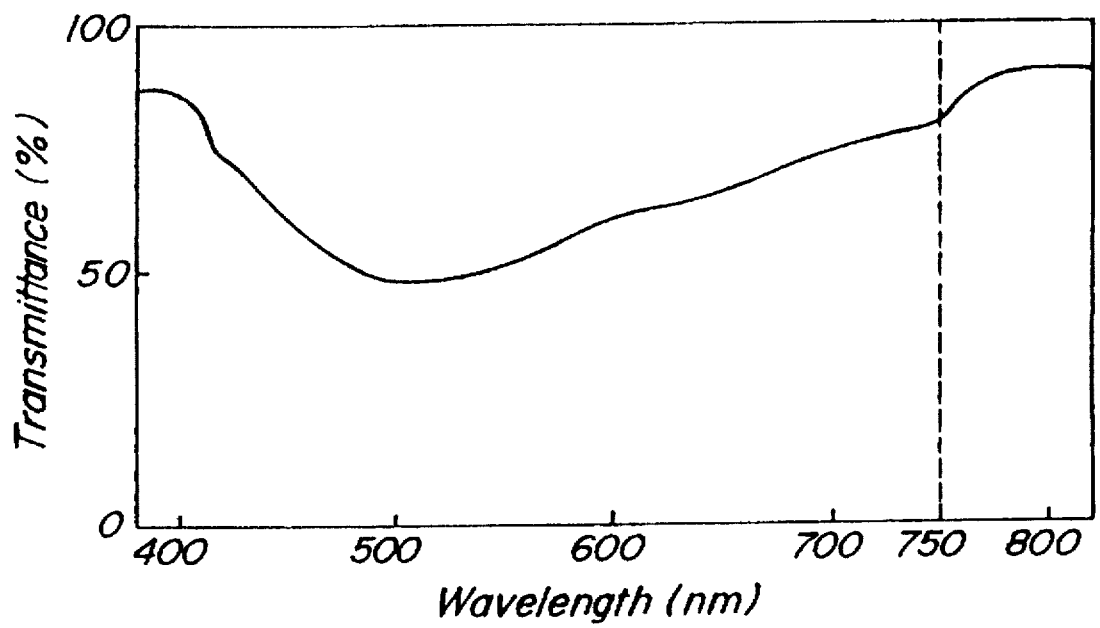
FIG. 12 is a spectral transmittance of an optical element used in the optical system shown in FIG. 10.

The optical element 14 having the spectral transmittance shown by the curve B in FIG. 11 may be formed by a color correction filter for magenta (trade name M-50 manufactured by HOYA COMPANY Japan). FIG. 12 shows a spectral transmittance of this color correction filter having a thickness of 2.5 mm. It has been confirmed that a similar color correction filter having a thickness which is about 1.25 mm has a spectral transmittance which is much similar to the spectral transmittance shown by the curve B in FIG. 11.

It should be noted that the total spectral transmittance of the lens system 11 is affected by the spectral transmittance of the refractive lenses 12 and 13 and anti-reflection coatings applied on surfaces of various optical elements. However, in practice, the influence of these factors upon the spectral transmittance of the total optical system is relatively smaller than that of the wavelength dependency of the diffractive element 15, so that it is sufficient to use the optical element 14 which can compensate the wavelength dependency of diffraction efficiency of the diffractive element 15.

In the above embodiment, the lens system 11 is designed to have the spectral transmittance which is substantially flat over the whole wavelength of the visible light. According to the invention, it is also possible to design the optical system such that the flat spectral transmittance can be attained over a limited wavelength range such as a case of a fluorescent microscope. That is to say, according to the invention, the spectral transmittance of the optical element can be determined such that a product between the diffraction efficiency of the diffractive element and the spectral transmittance of the optical element results in a desired spectral transmittance.

Figure 13:
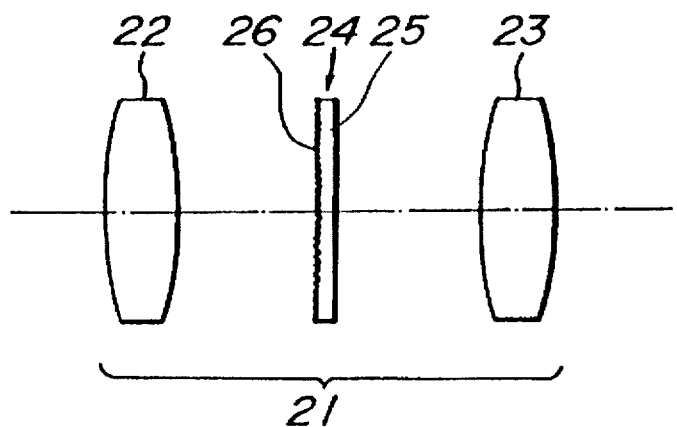
FIG. 13 is a schematic view depicting a third embodiment of the optical system according to the invention.

FIG. 13 is a schematic view showing a third embodiment of the optical system according to the invention. In the present embodiment, the optical system 21 comprises first and second refractive elements 22 and 23 and a diffractive element 24 arranged between the first and second refractive elements. The diffractive element 24 has a surface relief diffractive grating 26 formed on a surface of a substrate 25. In the present embodiment, the substrate 25 of the diffractive element 24 also serves as the optical element for compensating the wavelength dependency of diffraction efficiency of the diffractive grating 26. That is to say, the substrate 25 is made of a material having a spectral transmittance which is substantially complicated with the wavelength dependency of diffraction efficiency of the surface relief diffractive grating 26, so that the total spectral transmittance of the optical system 21 becomes substantially flat as in the embodiment shown in FIG. 10. In the present embodiment, the diffractive element 24 has the dual function, and thus the whole optical system is simple in construction and small in size. It should be noted that the optical element 24 having the diffractive grating 26 formed in the surface of substrate 25 may be utilized alone.

The present invention is not limited to the embodiments explained above, but many modifications and alternations may be conceived by those skilled in the art within the scope of the invention. For instance, the optical system according to the invention may be utilized in various optical systems. Further, in the embodiment shown in FIG. 3, the diffractive optical element is formed as the diffractive lens, but it may be constructed as other diffractive optical elements or may be used in combination with one or more refractive optical elements. In the embodiments shown in FIGS. 6 and 8, the number of the regions is set to two, but it may be set to any desired number. Moreover, a set of wavelengths for which the diffraction efficiency is optimized may be determined at will. In the embodiment of FIG. 8, the depth h of the grooves is set to be constant for all the regions, but the depth may be changed for respective regions, while the duty cycle is not changed for respective regions.

As explained above in detail, according to the invention the diffraction efficiency is optimized for a plurality of different wavelengths, so that any peak in the spectral transmittance can be flattened. Therefore, it is possible to obtain the substantially flat or uniform spectral transmittance over a desired wavelength.

What is claimed is:

1. An optical system for use in a predetermined wavelength range, said optical system comprising:

at least one diffractive optical element having a given wavelength dependency of diffraction efficiency so as to have a first spectral transmittance; and at least one optical element having a second spectral transmittance characteristics which, together with said first spectral transmittance, provides a desired overall spectral transmittance which is flatter over said predetermined wavelength range than either said first spectral transmittance or said second spectral transmittance.

2. An optical system according to claim 1, wherein said diffractive-optical element is formed by a surface relief diffractive grating whose diffraction efficiency is optimized for a wavelength within said predetermined wavelength range, and said optical element is made of a material having the second spectral transmittance which is substantially complementary to the wavelength dependency of diffraction efficiency of said surface relief diffractive grating.

3. An optical system according to claim 2, wherein said optical element comprises a color compensation filter.

4. An optical system according to claim 1, wherein said at least one diffractive optical element comprises a blazed diffractive surface.

5. An optical element according to claim 2, wherein said surface relief diffraction grating comprises a blazed diffractive surface.

6. An optical element according to claim 3, wherein said diffractive optical element comprises a blazed diffractive surface.

7. An optical system according to claim 1, wherein said at least one diffractive optical element is optimized to maximize a diffraction efficiency for first-order diffracted light.

* * * * *